United States Patent [19]

Hikita et al.

[11] Patent Number: 4,811,207
[45] Date of Patent: Mar. 7, 1989

[54] JOIN OPERATION PROCESSING SYSTEM IN DISTRIBUTED DATA BASE MANAGEMENT SYSTEM

[75] Inventors: Sakayuki Hikita; Suguru Kawakami; Hiromi Haniuda; Akifumi Sakamoto; Hideki Yamamoto, all of Tokyo, Japan

[73] Assignee: Oki Electric Industry Company, Ltd., Tokyo, Japan

[21] Appl. No.: 837,283

[22] Filed: Mar. 6, 1986

[30] Foreign Application Priority Data

Mar. 12, 1985 [JP] Japan ................................. 60-47452

[51] Int. Cl.$^4$ ...................... G06F 15/20; G06F 15/40
[52] U.S. Cl. ..................................... 364/200; 364/300
[58] Field of Search ... 364/200 MS File, 900 MS File, 364/300

[56] References Cited

U.S. PATENT DOCUMENTS

| 4,422,145 | 12/1983 | Sacco et al. | 364/200 |
| 4,435,758 | 3/1984 | Lorie et al. | 364/200 |
| 4,497,039 | 1/1985 | Kitakami | 364/900 |
| 4,631,664 | 12/1986 | Bachman | 364/200 |

OTHER PUBLICATIONS

"Using Semi—Joins to Solve Relational Queries", Journal of the Association for Computing Machinery, vol. 28, No. 1, by Philip A. Bernstein et al., Jan. 1981, pp. 25-40.

Primary Examiner—Gareth D. Shaw
Assistant Examiner—Kevin A. Kriess
Attorney, Agent, or Firm—Wenderoth, Lind & Ponack

[57] ABSTRACT

A join operation processing system and a method of operating the system is usable in a distributed database management system including multiple local database management systems, computers employing distributed databases stored in the local database management systems, and a communication network for connecting said local database management systems and the computers. The join operation processing system can perform a join operation on a relational database. Each of the computers instructs prior computer to performing the join operation, and the database management system, managing relations associated with the join operation to read definitions so as to define said relations, reads the read definitions to thereby determine a process to process the join operation, and issues a request to the prescribed database management system to perform join operation processing based on the determination. Each database management system transfers a local processing result and a local processing request among the database management systems and performs the join operation processing in a pipe line processing sequence.

4 Claims, 9 Drawing Sheets

```
RX( A1  A2  A3 )
     a   A   1
     b   B   2
     c   C   3
     e   D   4
     d   E   5
```

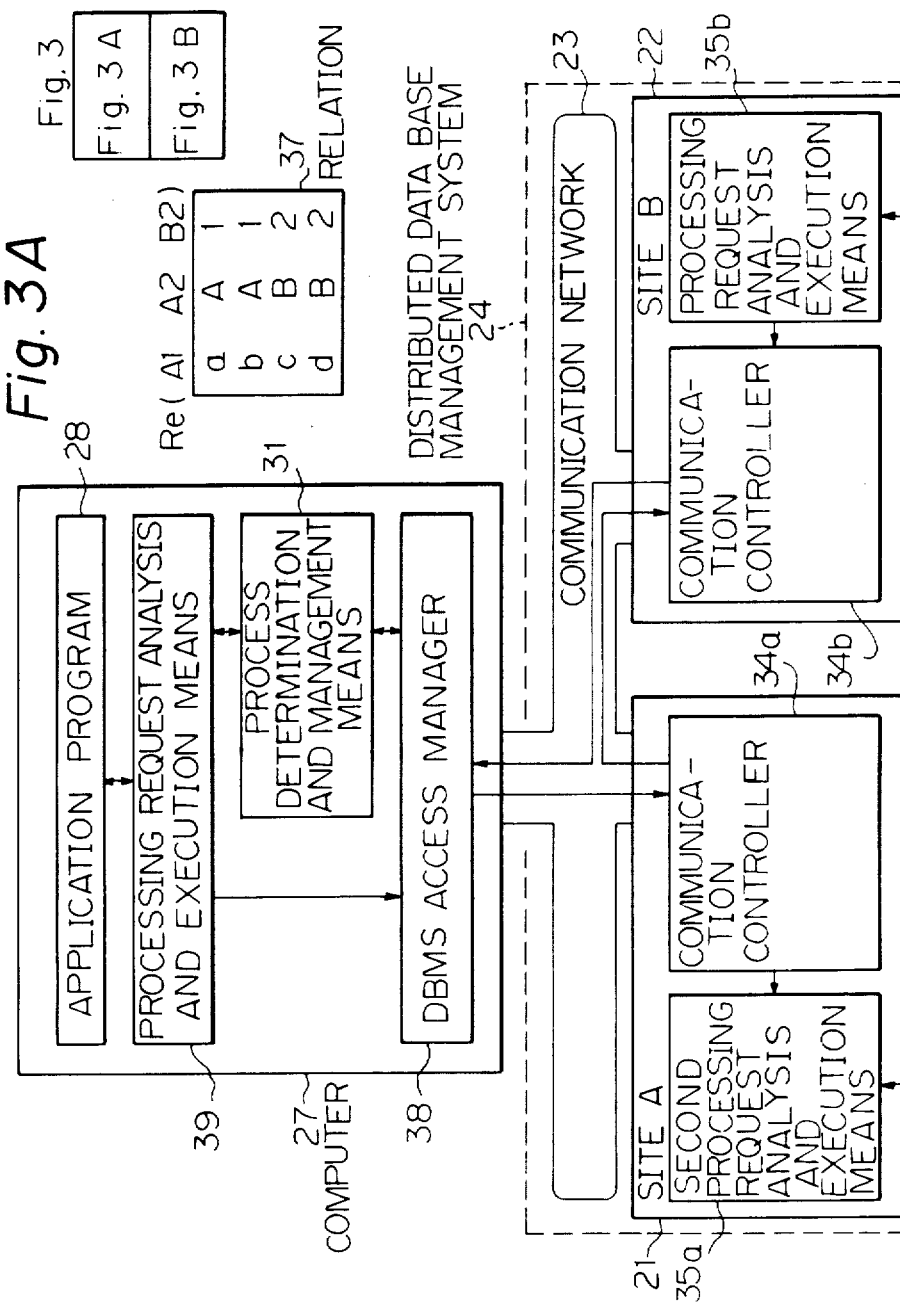

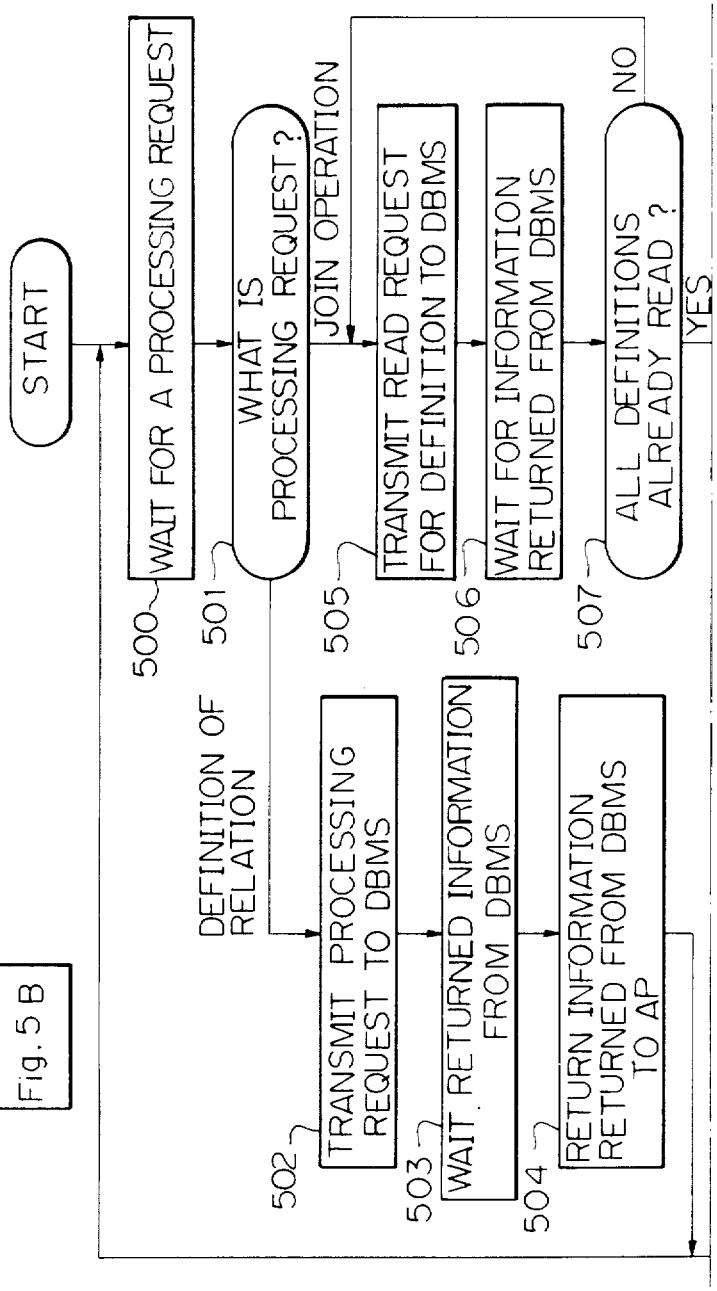

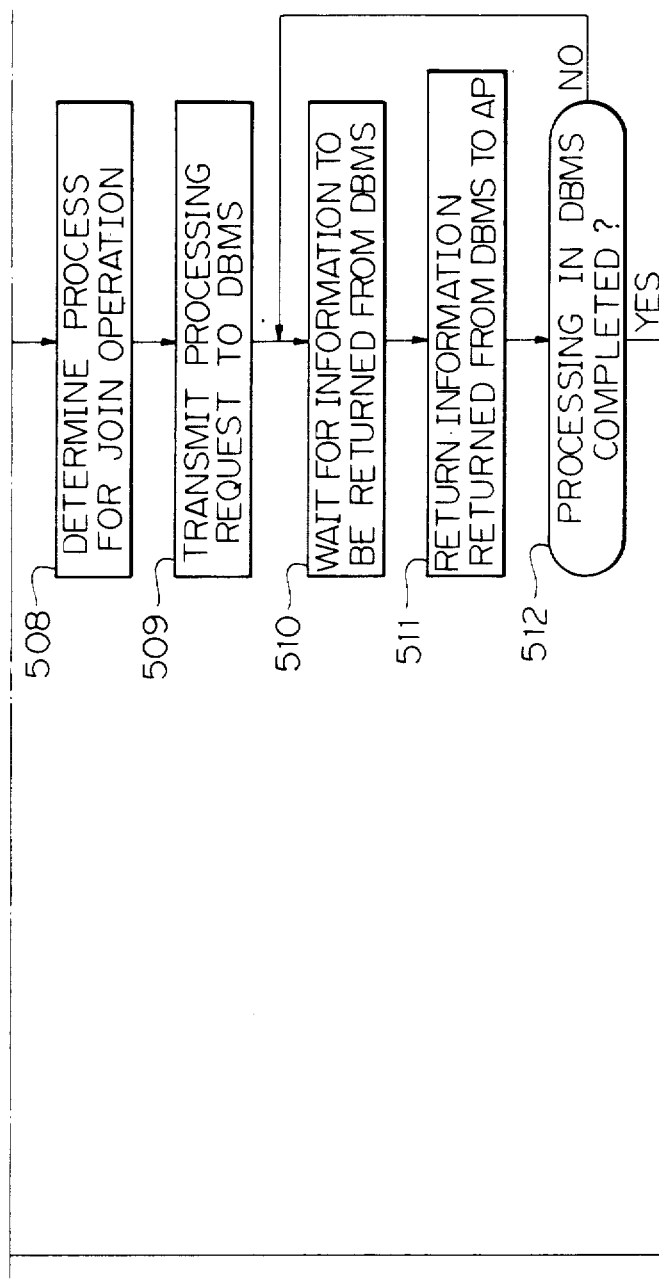

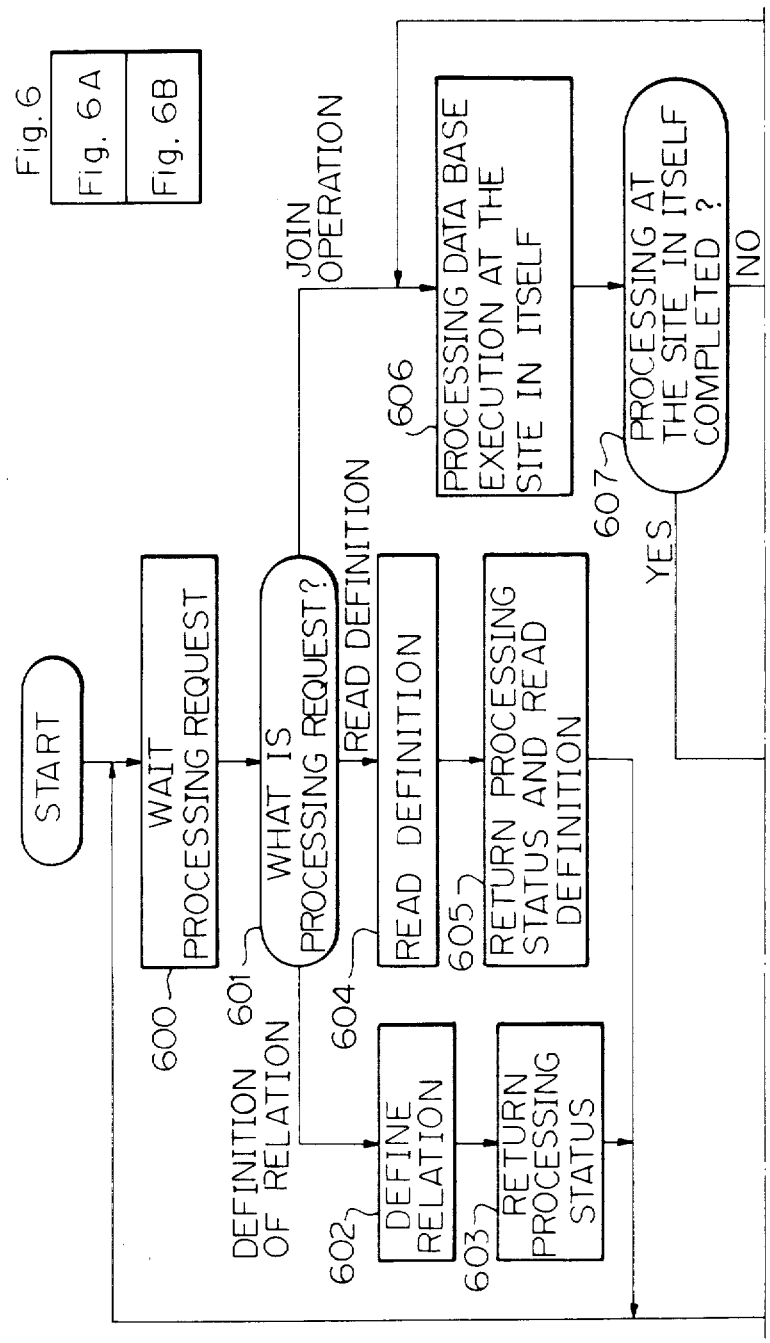

JOIN OPERATION PROCESSING SYSTEM IN DISTRIBUTED DATA BASE MANAGEMENT SYSTEM

BACKGROUND OF THE INVENTION

1. Field of the Invention

The present invention relates to a join operation processing system suitable for performing a join operation on a relational database usable in a distributed database management system.

2. Description of the Prior Art

A distributed database management system consists of general local database management systems, each called sites, interconnected with each other by various networks. These sites have memories, each memory including databases distributed and stored therein. A join operation on the relational databases distributed to a multiple sites is needed to be performed at one site by transferring all relational tuples related to the join operation from the other sites to the above one site.

The above method however must also transfer any tuple which is considered not to be involved in a relation as the final result of the join operation. Accordingly, the amount of data transmitted among sites determines the rate of the join operation and the cost of the operation.

A method is known for solving such a problem, which is disclosed in "Using Semi-Joins to Solve Relational Queries" Journal of the Association for Computing Machinery, Vol. 28, No. 1, January 1981, pp 25 to 40. According to this method, the amount of data transferred from a certain site to another site, when relation transmission between the above sites is required to perform a join operation, can be reduced by transferring only attribute values associated with the join operation, thereby performing a semi-join process for the join operation wherein a relation comprising only tuples finally involved in the relation which is considered to be yielded as the result of the join operation is prepared, and transferring the relation as a result of the above semi-join process.

FIG. 1 illustrates a prior art join operation processing system and FIG. 2 likewise illustrates a relation to be processed in the join operation processing system of FIG. 1. In FIG. 2, RX is called a relation name, while A1, A2 and A3 each called an attribute name. In addition, a, b and c or the like are named attribute values of an attribute A1, and A, B, C or the like named attributed values of A2. Moreover, for data types of the respective attributes, A1 represents an English small letter, A2 an English capital letter, and A3 a numeral. A row, for example, such as (a A1) and (b B2), etc., is named a tuple.

Operation of a prior art join operation processing system will be described with reference to FIG. 1. Considering, for example, a join operation processing wherein a relation 3 (named R) managed by a site 1 and a relation 4 (named P) managed by a site 2 are subjected to the join operation under conditions that values of attributes A2 and B1 are equal to each other, and thereafter the resultant relation is transferred to a computer 5 connected with the site 1.

First, a request from an application program 6 of the computer 5 to a distributed data base management system 7, namely, a request for performing a join operation between the relations R and P of a distributed database 18 is transmitted via a database management system access manager 8.

Then, the processing request is analyzed by a processing request analyzer 9a and transferred to a process determining means 10a. The process determining means 10a determines the process in conformity with the analyzed result and informs a database manager 11a of the determined process. The database manager 11a executes a prescribed join operation in conformity with the execution process. In addition, the database manager 11a also has a function to inform, if processing at another site is needed, a database manager of the another site of a necessary process through an intersite communication controller 14a.

The process will further be described in detail. First, as a semi-join process, a project operation is executed on the relation R by the database manager 11a whereby a relation 12 (named R') comprising only the attribute A2 is prepared as an intermediate result. The relation 12 is stored in a local database 13a managed by the site 1.

The database manager 11a transfers a process to be performed by the database manager 11b in the site 2 as well as the relation 12 to the database manager 11b via the intersite communication controllers 14a and 14b and a communication network 15.

The database manager 11b subjects the transmitted relation 12 and a relation 4 (named P) stored in the database 13b managed by itself to a join operation in conformity with the transmitted process, and obtains a relation 16 (named P') as an intermediate result, and stores it in the database 13b. The database manager 11b transfers the relation 16 to a database 13a managed by the site 1. The database manager 11a performs a join operation on the relations 16 and 3 and transfers the resultant relation 17 to the computer 5.

For the join operation processing system, it is assumed that the transfer capability of a communication network for connecting the respective sites of the distributed data base management system to each other is relatively low, and thus, the amount of communication among the respective sites is reduced.

Namely, a semi-join process at each site imposes a burden on the database management system in the situation as described below.

(1) Throughput in each site is low.

(2) Queries from many users are concentrated to any particular site.

(3) Any relation to be processed is large in its capacity and thus an intermediate process yielded by the semi-join process must also require a large capacity.

SUMMARY OF THE INVENTION

It is an object of the present invention to prevent a process speed from deterioration due to a semi-join process in the join operation processing system.

Another object of the present invention is to provide a join operation system operable as a pipe line process for thereby improving a process speed of a join operation in a distributed database management system.

To achieve the above objects, a method of operating a join operation processing system according to the present invention in a distributed database management system having multiple sites each including memories, multiple distributed databases each being stored in each of said memories, computers each connected to said sites via a network for employing said distributed databases, comprises the steps of:

(a) analyzing a processing request from an application program running in the computer for thereby determining whether the request is one for defining relations or one for processing a join operation;

(b) allowing the computer to transmit, in case of the request to define the relations in conformity with the result of the analysis, the request to define the relations to each site, and, in case of the request to process the join operation, allowing the computer to transmit a request to read information to define relations to each site;

(c) allowing each of the sites to analyze the request from the computer for thereby determining whether the request is the request to define the relations or the request to read the relation definition, and if the request is the relation definition request, then store the defined information in the memory, and, if the request is the read request, then read the defined information previously stored in the memory and transfer the read defined information to the computer;

(d) allowing the computer to determine, upon receiving the relation definitions from each of the sites, an execution process to perform the join operation therefor in conformity with the join operation request and to thereby transmit a local processing request to a predetermined site, (e) allowing each of the sites receiving the local processing request to perform a local join operation on the relation managed by the site itself, and to transmit, if there is any processing to be performed by any site on and after the next site, a local processing request for the next site to perform local processing and the result of the local join operation to the next site, while returning, if there is no processing to be done on and after the next site, the result of the join operation process effected in the site itself to the computer.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 3B:
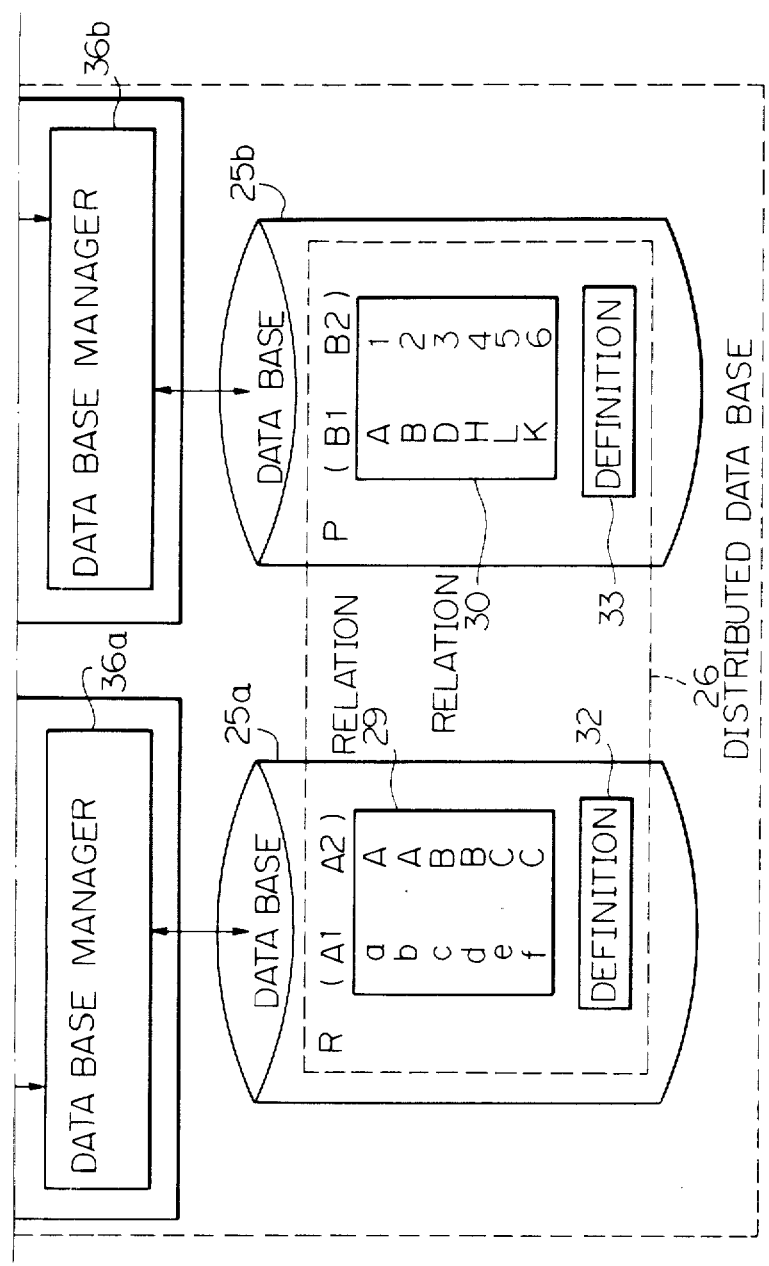

Referring to FIG. 3 illustrating an embodiment of the present invention with two sites, operation of the join operation processing system will be described.

As shown in the figure, a distributed database management system (hereinafter abbreviated as DDBMS) 24 is constituted by database management systems (hereinafter abbreviated as DBMS) of sites 21 and 22 interconnected with each other through a communication network 23. Furthermore, a distributed database 26 is constituted by local databases 25a and 25b managed by the respective sites described above.

The database at each site stores therein a relation definition for each of the stored relations. The relation definitions are unique to a relation, for example, such as a relation name, each attribute name, a data type of each attribute, length of each attribute value, an INDEX name, and the number of all records, etc.

In FIG. 3, definition 32 is a definition for a relation 29 while definition 33 is one for a relation 30.

A computer 27, by making use of the DDBMS 24, is interconnected with the two sites via the network 23, and includes a first processing request analysis and execution means 39, a process determination and management means 31 and a DBMS access manager 38.

Each of the sites has communication controllers 34a and 34b, processing request analysis and execution means 35a and 35b, and database managers 36a and 36b.

Figure 6B:
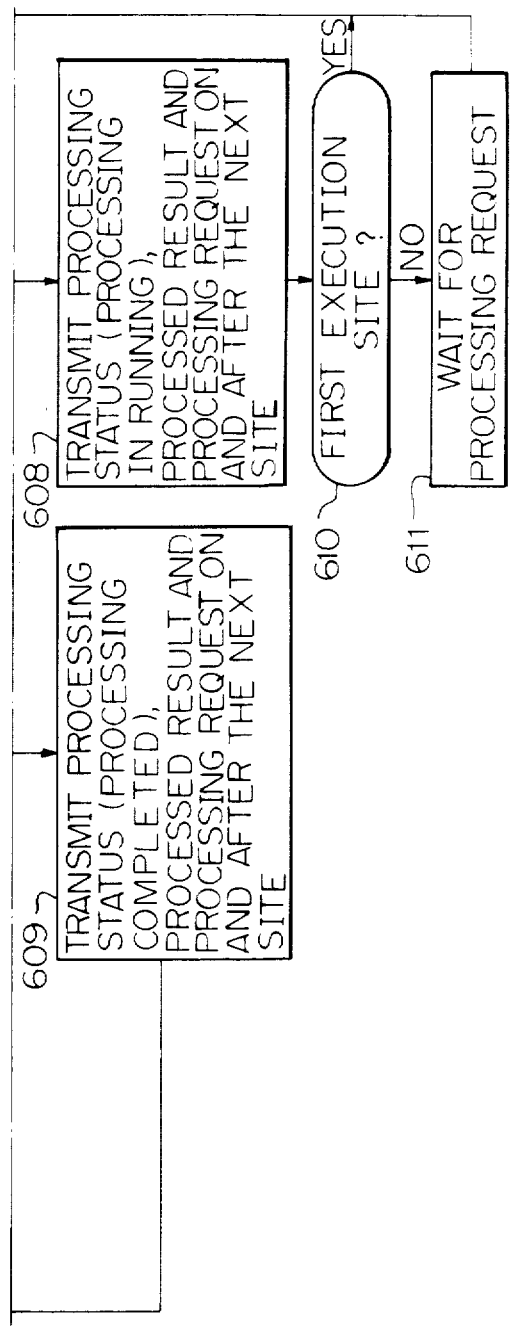

Referring to FIGS. 3, 5 and 6, the processing to define a relation and a flow of the processing of a join operation in respective sites 21 and 22 will be described.

(A) Processing to define a relation

A-(a) First, a request to define a certain relation is issued from an application program (hereinafter, abbreviated as AP) 28 to a first processing request analysis and execution means 39 which is in a wait state for a processing request (FIG. 5: Step 500).

Figure 1A:
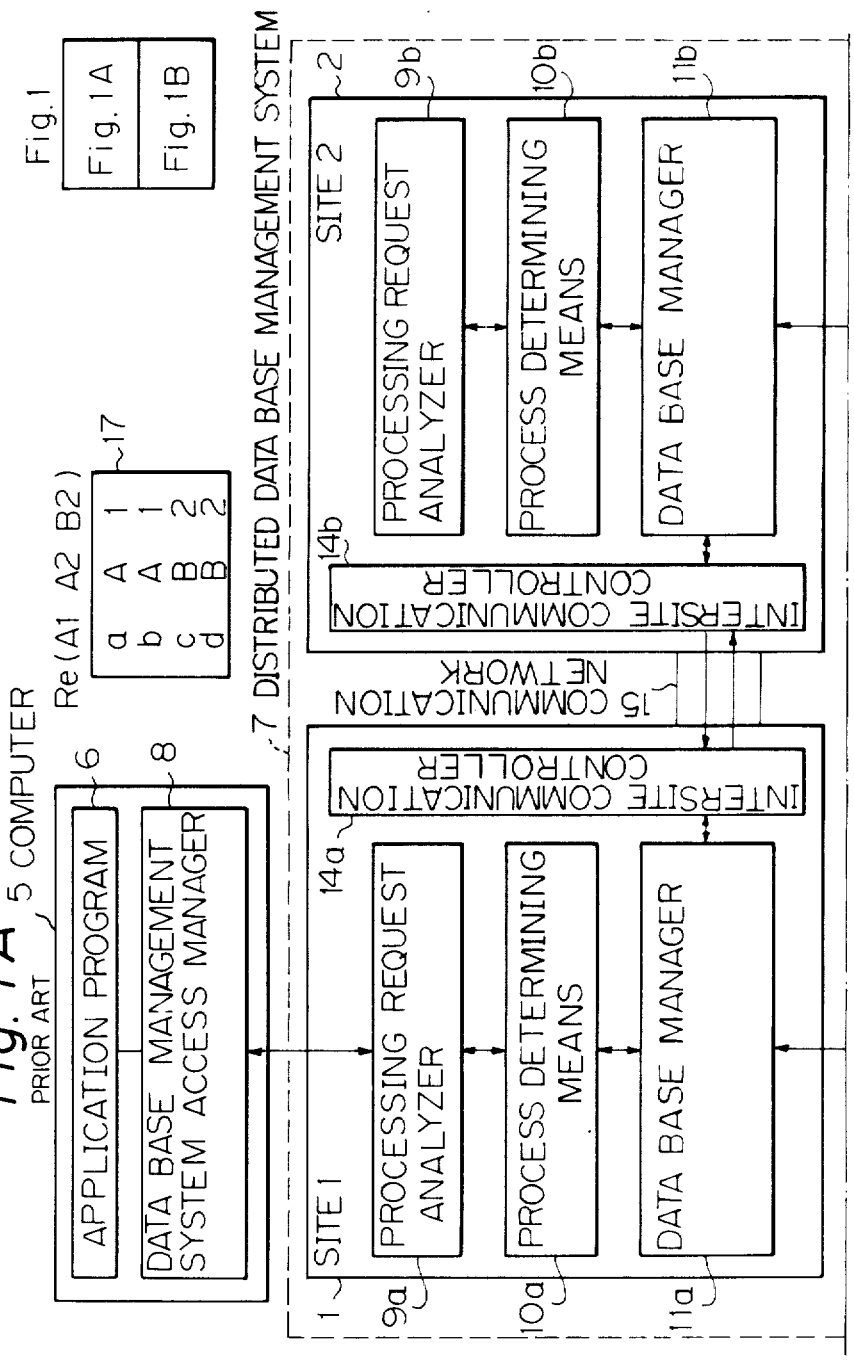
FIG. 1, consisting of FIGS. 1A and 1B, is a block diagram illustrating operation of a prior art distributed database management system.
Figure 1B:
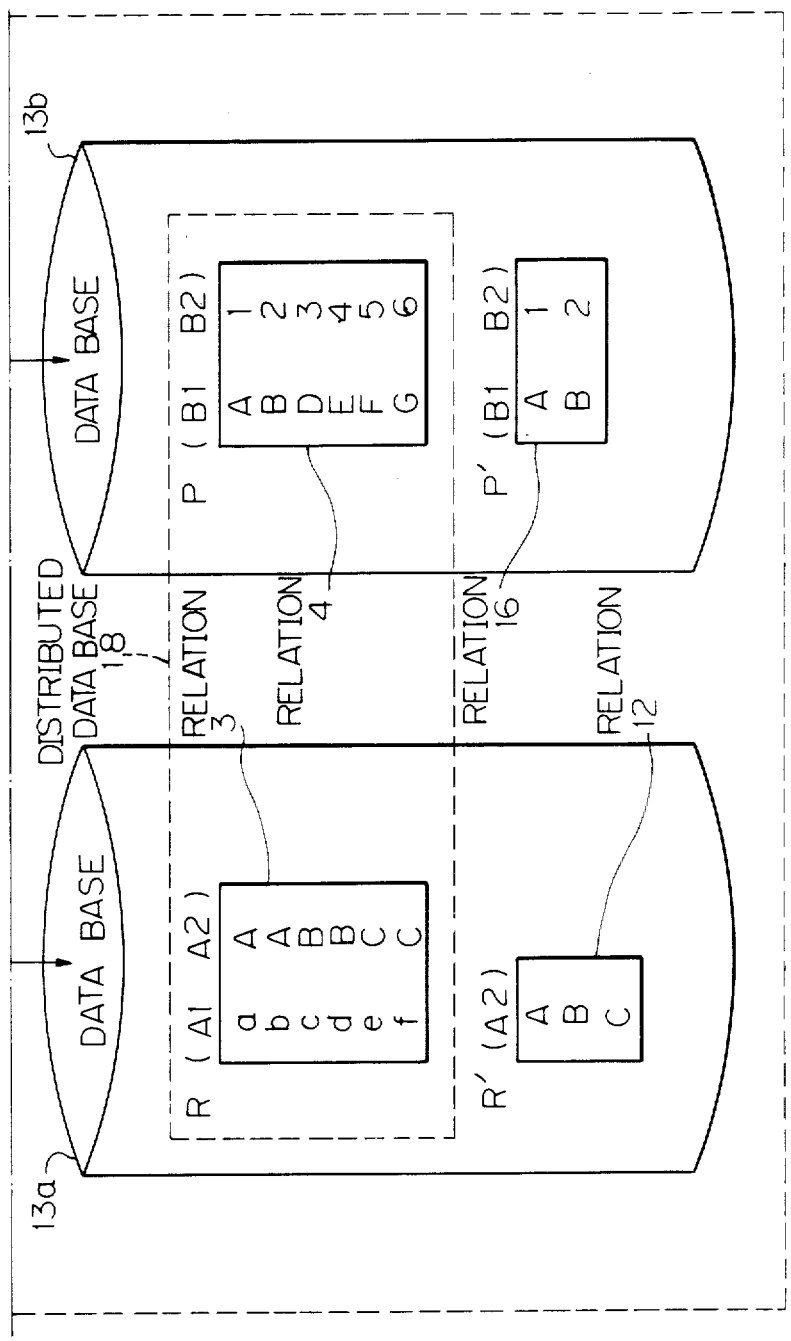

A-(b) The first processing request analysis and execution means 39 analyzes the processing request from the AP 28 (FIG. 1: step 501). Assume that the processing request is a request to define a relation.

A-(c) The definition request for the relation is transmitted to the site (FIG. 5: Step 502). Assume that the definition request is transmitted to the first processing request analysis and execution means 39—DBMS access manager 38—site 21.

A-(d) The processing request is received by the first communication control means 34a in the wait state for the processing request, and delivered to a second processing request analysis and execution means 35a (FIG. 6: Step 600).

A-(e) The second processing request analysis and execution means 35a analyzes the processing request (FIG. 6: Step 601). The processing request is decided to be the definition request for a relation.

A-(f) The relation definition request is delivered to the first database manager 36a by the second processing request analysis and execution means 35a, and the first database manager 36a defines the relation (FIG. 6: Step 602).

A-(g) The computer 27 is informed of the processing state (FIG. 6: Step 603). Namely, the relation is defined by the first database manager 36a, and a fact that the definition information is stored in the database 25a is returned to the computer 27 in the order of the first database manager 36a—second processing request analysis and execution means 35a—first communication execution control means—computer 27. Thereafter, the site 21 returns again to a wait state (FIG. 6: Step 600).

A-(h) The processing status from the site 21 is received by the DBMS access manager 38 which is in a wait state for the processing information (FIG. 5: Step 503).

A-(i) The processing information from the site 21 is returned from the DBMS access manager 38 to the application program 28 via the first processing request analysis and execution means 39 (FIG. 5: Step 504). Thereafter, the first processing request analysis and execution means 39 returns again to the wait state for the processing request (FIG. 5: Step 500).

The processing from A-(a) to A-(i) described above are executed at each site according to the decision of the first processing request analysis and execution means 39 prior to the request for the join operation from the application program 28.

(B) A flow of a join operation in the computer 27.

B-(a) The first processing request analysis and execution means 39 is in a wait state for any processing request. Issued a join operation request from the application program 28, it is received by the processing request analysis and execution means 39 (FIG. 5: Step 500).

In the present example, the requested join operation is supposed to be a request "the relation 29 (named R) and the relation 30 (named P) are joined each other under the condition that the values of the attributes A2 and B1 are equal to each other, and the result is returned to the computer 27."

B-(b) The processing request is analyzed by the first processing request analysis and execution means 39 (FIG. 5: Step 501). The processing request is determined to be one for the join operation, and is delivered to the process determination and management means 31.

B-(c) A request to read the relation definition is transmitted from the process determination and control means 31 to each site via the DBMS access manager 38 (FIG. 5: Step 505). It is assumed in the present example that a read request for definition 32 related to the relation R29 is, for the first time, transmitted to the site 21, and a read request for definition 33 related to the relation P30 is transmitted to the site 22 for the second time.

B-(d) The processing status and the relation definition from each site are received by the DBMS access manager 38 which is in a wait state for information to be returned from each site (FIG. 5: Step 506).

In the present example, the DBMS access manager 38 receives the definition 32 for the first time and the definition 33 for the second time from the assumption of the B-(c).

B-(e) The information returned from each site is delivered to the process determination and management means 31. The process determination and management means 31 decides whether all definitions needed to determine the process are read from each site or not (FIG. 5: Step 507). If all the definitions are already read, then the processing advances to the next process (FIG. 5: Step 508), while if there remains any definition to be read, then the control returns to the above process of B-(c) (FIG. 5: Step 505).

B-(f) The process determination and management means 31 determines the process for the join operation (FIG. 5: Step 508).

The process in the present example comprises:

(1) issuing a processing request to the site 21, (2) allowing the site 21 to retrieve the relation R29 and to transmit to the site 22 the retrieved result and a request of processing by the site 22, and (3) allowing the site 22 to perform a join operation on the retrieved result transmitted from the site 21 and the relation P30 in conformity with the processing request transmitted from the site 21, and to deliver the result to the computer 45.

B-(g) The processing request is transmitted to the site 21 in conformity with the process determined in B-(f) (FIG. 5: Step 509). The processing request is transferred in the order of the process determination and management means 31—DBMS access manager 38—site 21. The DBMS access manager 38 waits for information to be returned from the site 22.

B-(h) The DBMS access manager 38 receives the processing status and the result of the processing from the site 22, and supplies them to the process determination and management means 31 (FIG. 5: Step 510).

In the present example, according to conditions in E-(e) and E-(h) described later, each site keeps on processing. As the result of the join operation, tuples (a A1) and (b A1) are obtained for the first time, and tuples (c B2) and (d B2) are obtained next. For the third time, all the sites have completed the processing, and as the result of the join operation, a null set is received by the computer 27. Finally, the application program 28 of the computer 27 has a relation 37 (named Re).

B-(i) The process determination and management means 31 returns the processing status and processing result described above to the AP 28 (FIG. 5: Step 511). This is conducted via the first processing request analysis and execution means 39.

B-(j) The process determination and management means 31 determines whether or not the processing at each site is already completed (FIG. 5: Step 512). With the completion, the control returns to the wait state of Step 500, and otherwise returns to the processing of B-(h) described above (FIG. 5: Step 510).

(C) Processing to read relation definition at site 21.

C-(a) The first communication controller 34a is in a wait status for a processing request. Transmitted the processing request from the computer 27, the communication controller 34a receives it and transfers it to the second processing request analysis and execution means 35a (FIG. 6: Step 600).

C-(b) The second processing request and analysis execution means 35a analyzes the processed request (FIG. 6: Step 601). In the present example, the processing request is that for definition on the relation R29.

C-(c) The read request for the relation definition is transferred by the second processing request analysis and execution means 35a to the first database manager 36a, which means 36a reads the definition 32 on the relation R29 (FIG. 6: Step 604).

C-(d) The processing status and the relation definition 32 are returned to the computer 27 (FIG. 6: Step 605). Namely, the first database manager 36a reads the definition 32 on the relation R, and the definition 32 and completion of the read operation are returned to the computer 27 in the order of the first database manager 36a—second processing request analysis and execution means 35a—first communication controller 34a—computer 27. Thereafter, the site 21 again returns to a wait state (FIG. 6: Step 600).

(D) Join operation in site 21.

D-(a) A processing request is transmitted from the computer 27 in the wait state of the first communication controller 34a for the processing request, and the processing request is received by the first communication controller 34a and transferred to the second processing request analysis and execution means 35a (FIG. 6: Step 600).

D-(b) The second processing request analysis and execution means 35a analyzes the processing request (FIG. 6: Step 601). The processing request is determined to be a request for join operation (that is retrieval on the relation R29 and transmission of the result to the site 22).

D-(c) The second processing request analysis and execution means 35a requests "retrieval" to the first database manager 36a, which means 36a then retrieves the relation R29 and returns the result to the second processing request analysis and execution means 35a (FIG. 6: Step 606).

Since in the present example, retrieval is performed in conformity with values of the attribute A2, tuples (aA), (bA) are retrieved for the first time,
tuples (cB), (dB) retrieved for the second time, and
tuples (eC), (fC) retrieved for the third time.

D-(d) The second processing request analysis and execution means 35a determines whether or not all of the retrieval processing is completed (FIG. 6: Step 607). If the retrieval processing has not been completed, the operation goes forward to the next processing of D-(e) (FIG. 6: Step 608). If the retrieval processing has been completed, it further goes forward with the processing of D-(g) described later (FIG. 6: Step 609).

In the present example, the operation advances to Step 608 based on the conditions described in D-(c) after the first and second retrieval processings, and to Step 609 for the third time.

D-(e) The second processing request analysis and execution means 35a informs the site 22 of the processing state, i.e., a fact that the processing in the site 21 is running, and the retrieved result via the first communication controller 34a. The second processing request analysis and execution means 35a also transmits a request for processing to be done in the site 22 (FIG. 6: Step 608).

The site 20 starts its operation by receiving the processing request described above.

D-(f) The second processing request analysis and execution means 35a determines whether or not the site 21 is a site executing the first join operation (FIG. 6: Step 610).

The site 21 is determined to be the site executing the first join operation, and the operation returns to D-(c).

D-(g) The second processing request analysis and execution means 35a transmits the processing status, i.e., a fact that the processing at the site 21 has been completed, and the retrieved result to the site 22 via the first communication controller 34a. Then, a request to process at the site 22 is also transmitted (FIG. 6: Step 609). When both the transmissions have been completed, the site 21 again returns to a wait state (FIG. 6: Step 600).

(E) Join operation at the site 22.

E-(a) The second communication execution and control means 34b is in a wait state for a processing request. After receiving the processing request from the site 21 described in D-(e) by the second communication controller 34b, the processing request is transferred to the third processing request analysis and execution means 35b (FIG. 6: Step 600).

E-(b) The third processing request analysis and execution means 35b analyzes the transferred processing request (FIG. 6: Step 601). The processing request is determined to be a request for operation to be conducted by the site 22, i.e., execution of a joint operation between the tuple transferred from the site 21 and the relation P30 managed by the site 22 itself and transmission of the join operation result to the computer 27.

E-(c) The third processing request analysis and execution means 35b transfers the analyzed result to the second database manager 36b. The second database manager 36b effects a join operation between the tuple transmitted from the site 21 and the relation P30 in conformity with the above analyzed result (FIG. 6: Step 606).

In the present example, a join operation is performed between the relation P30 and the tuples (a A) and (b A) for the first time, the tuples (c B) and (d B) for the second time, and the tuples (e C) and (f C) for the third time.

The result is tuples (a A1) and (b A1) for the first processing, tuples (c B2) and (d B2) for the second time, and a null set for the third time.

E-(d) The third processing request analysis and execution means 35b determines, based on the processing status transferred from the site 21 (the processing in the site 21 is in running or not), whether or not all of the processings in the site 22 has been completed.

If the processing has not been completed, the operation advances to processing of E-(e) described later (FIG. 6: Step 608), and if the processing has been completed, the operation advances to E-(h) described later (FIG. 6: Step 609).

In the present example, the operation advances to Step 608 in the first and second decisions and to Step 609 in the third decision based on the conditions of D-(d).

E-(e) The third processing request analysis and execution means 35b transmits the processing status, i.e., a fact that the processing in the site 22 is running, and the join operation result in the site 22 to the computer 27 via the second communication controller 34b (FIG. 6: Step 608).

In the present example, the join operation result transmitted to the computer 27 is, based on E-(c), tuples (a A1) and (b A1) for the first time and tuples (c B2) and (d B2) for the second time.

E-(f) The third processing request analysis and execution means 35b determines whether or not the site 22 is a site in which the first join operation was performed (FIG. 6: Step 610).

The site 22 is determined to not be the site in which the first join operation was performed, and the processing advances to E-(g) (FIG. 6: Step 611).

E-(g) The second communication controller 34b receives the next processing request from the site 21, which is supplied to the processing request analysis and execution means 35b (FIG. 6: Step 611). The processing returns to Step 606 of E-(c).

E-(h) The third processing request analysis and execution means 35b transmits the processing status, i.e., completion of the processing in the site 22, and the result of the join operation in the site 22 to the computer 27 via the second communication controller 34b (FIG. 6: Step 609). Thereafter, the site 22 again returns to a wait status (FIG. 6: Step 600).

The last operation result is a null set based on E-(c).

As described above, in the join operation processing, the processings from B-(g) to B-(j), from D-(a) to D-(g), and from E-(a) to E-(h) constitute pipe line processing in the order of the computer 27—site 21—site 22—computer 27. Accordingly, according to the present invention, the number of data transmissions between the sites can be reduced as compared with prior art cases, and a burden brought about by the semi-join process can be reduced and thus the join operation processing in the distributed database management system can be achieved at a higher speed.

Figures 2, 4:
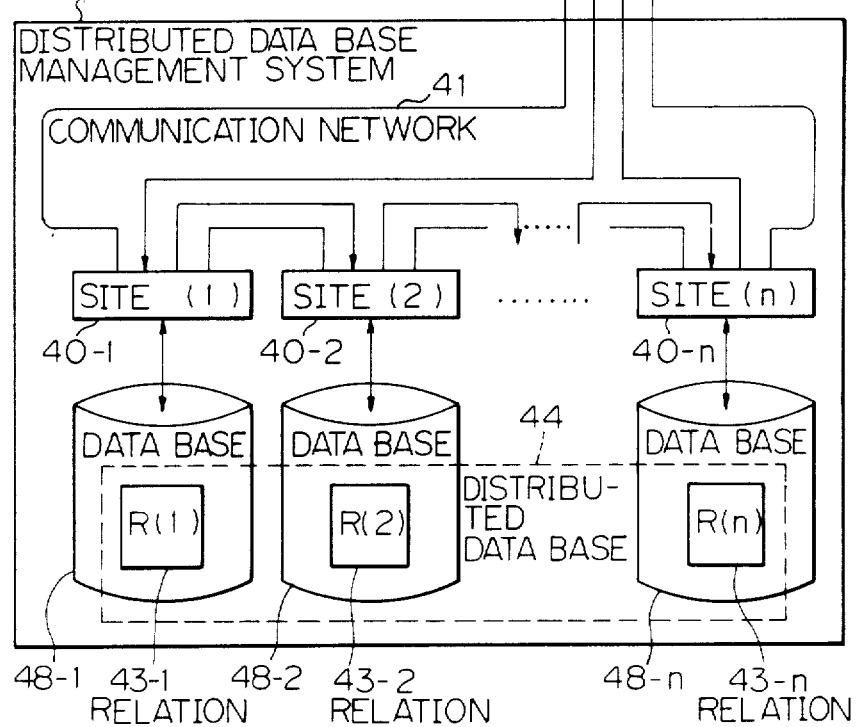
FIG. 2 is an exemplary view of a relation for illustrating the structure of the relation for use in a join operation processing, FIG. 3, consisting of FIGS. 3A and 3B, is a block diagram illustrating a preferred embodiment of a join operation system according to the present invention.
FIG. 4 is a fragmentary block diagram illustrating another embodiment of the join operation system according to the present invention, FIG. 5, consisting of FIGS. 5A and 5B, is a flowchart illustrating operations, in the embodiment of the present invention shown in FIG. 3, of a processing request analysis and execution means 39, a process determination and management means 31, and a database management system access manager 38 in the computer 27, and FIG. 6, consisting of FIGS. 6A and 6B, is a flowchart illustrating operations, in the embodiment of the present invention shown in FIG. 3, of respective sites 21, 22.

In FIG. 4 illustrating a fragmentary block diagram of another embodiment according to the present invention, a distributed database management system 42 comprises multiple sites 40-1, 40-2, ..., 40-n, and a network 41 for interconnecting them, and processes a distributed database 44 comprising local databases 48-1, 48-2, ..., 48-n managed by each site.

The interiors of a computer 45 and a site 40-n are, although partly shown in FIG. 4, the same in their arrangements as those of the computer 27 for the site 21 or the site 22 of FIG. 3.

A join operation processing request on relations 43-a, 43-2, presented to the site 40-1 in conformity with a process is determined by a process determination management means 47 in the computer 45. Then, the site 40-1 processes a relation 32-1 (named R(1)) managed by itself in conformity with the contents of the above processing request, and transmits the processed result and processing requests on and after the next sites to the next site 40-2.

As the site 40-2 receives the result processed at the site 40-1 from the site 40-1 in conformity with the processing request from the site 40-1, it performs any operation on a relation 43-2 (named R(2)) managed by itself and the above result and transmits the yielded result and a processing request on and after the next site to the next site. The above processing is successively operated, and the final result is stored in a database 48-n managed by the site 40-n. The site 40-n returns the final result to the computer 45.

These processings from that in the site 40-1 to that in the site 40-n, and the transmission from the site 40-n to the computer 45 establishes pipe line processing, which can effect join operation processing at a higher speed as in the embodiment described with reference to FIG. 3.

Although certain preferred embodiments have been shown and described, it should be understood that many changes and modification may be made therein without departing from the scope of the appended claims.

What is claimed is:

1. A method of operating a join operation processing system in a distributed database management system including multiple sites each having a memory and computers each employing a distributed database stored in said memory, said multiple sites and computers being interconnected via a communication network, said method comprising the steps of:
  (a) determining whether a processing request from one of the computers is a request to define relations or a request to perform a join operation;
  (b) transmitting the request to define the relations to each of the sites if said processing request is a request to define the relations, and transmitting a request to read relation definition to each of the sites if said processing request is a request to perform the join operation;
  (c) analyzing the request at each of said sites, for determining whether said request is a request to define the relation or a request to read the relation definition,, and storing the definition in said memory if said request is a request to define the relation, and reading said definition previously stored in the memory and transferring it to the computer if said request is a request to read the relation definition;
  (d) determining, upon receiving the relation definitions from each of the sites, a process to perform said join operation in accordance with said request for the join operation, and transmitting a local processing request to a predetermined site;
  (e) performing at each of said sites receiving said local processing request a local join operation of the relation managed by the site itself, and transmitting to the next site, if there is processing to be done on the next site, a request for the next site to perform local processing and the result of said local join operation and, if there is no processing to be done on the next site, transmitting the result of the join operation processing effected in the site itself to said computer, so as to thereby effect a join operation between said computer and each site in a pipe line processing sequence based on said steps.

2. A method of operating a join operation processing system according to claim 1, wherein said request to define the relations described in step (a) is created prior to the request for performing the join operation.

3. A join operation processing sysem in a distributed database management system including a plurality of sites each having a memory and computers each for employing a distributed database stored in said memories, said sites and computers being interconnected via a communication network;
  wherein each of said computers comprises:
  (a) a processing request analysis and execution means for analyzing a processing request on said distributed database from the application program running on the computer, and for determining whether said processing request is a request to define the relations or the processing request for the join operation, and for transmitting, if said processing request is a request to define the relations, said defining request to each site, and, if said processing request is a request to perform the join operation, transmitting a request to read the relation definition to each site, and
  (b) a process determination and management means for determining a process to perform join operation based on the relation definition returned from each site and for transmitting local join operation requests to a predetermined site in accordance with said process;
  and wherein each of said sites comprises:
  (c) a processing request analysis and execution means for analyzing whether the received processing request is a relation defining request from the computer, or a processing request to perform said local join operation, or a request to read the relation definition from the computer, or a request to perform the join operation from said site, and
  (d) a database manager means for defining a relation managed by a site itself and for storing the relation definition in said memory if said received processing request is a relation defining request, and reading said relation definition previously stored in said memory and transferring the read result to the computer if said received processing request is a request to read the relation definition, and for receiving, if said received processing request is a request to perform the join operation from said site, a processed result in other site in succession to said join operation processing request, and for performing the join operation processing on said processed result and on the relation managed by the site itself, and for transmitting, said join operation processing rsult to said computer if there is no processing to be done in the next site, and transmitting a processing request to a site other than the next site and the processed result in the site itself if there is any processing to be done at a site other than the next site, so as to thereby effect a join operation between the computer and each site in a pipe line processing sequence.

4. A join operation processing system in a distributed database management system including multiple sites each having a memory, and computers each employing a distributed database stored in said memories, said multiple sites and computers being interconnected via a communication network;

wherein each of said computers comprises:

a processing request analysis and execution means for analyzing a request to process the distributed database, and a process determination and management means for transmitting, if said processing request is a request to process a join operation, a request to read a definition to each site, and for determining a process for the join operation based on the definition transmitted from each site, and for transmitting the processing request based on said process to a predetermined site, and a DBMS access manager for receiving the processed result from the site and transmitting said processed result to the site issuing said processing request;

and wherein each of said sites comprises:

a database processing execution control for reading the definition previously stored in the database and for transmitting the read result to said computer if said received processing request is a request to read the definition from said computer, and a database manager for retrieving the database and for transmitting the retrieved result and a processing result to be done on the next site if said received processing request is a request to perform the join operation from said computer, a second database manager for processing the retrieved result or the retrieved result from the previous site and relations in the database in the present site itself if the received processing request is a processing request from the previous site, and for transmitting the processed result to said computer if there is no processing to be done by the next site, and for transmitting the processed result and a request for processing to be done on the next site if there is any processing to be done in the next site, whereby said join operation processing is performed between said sites and said computers in a pipe line processing sequence.

* * * * *